United States Patent
Xiaoning

(10) Patent No.: US 8,712,756 B2
(45) Date of Patent: Apr. 29, 2014

(54) CHARACTER INPUT DEVICE AND PROGRAM FOR DISPLAYING NEXT WORD CANDIDATES BASED ON THE CANDIDATES' USAGE HISTORY

(75) Inventor: Sun Xiaoning, Tokyo (JP)

(73) Assignees: Sony Corporation, Tokyo (JP); Sony Mobile Communications AB, Lund (ES)

( * ) Notice: Subject to any disclaimer, the term of this patent is extended or adjusted under 35 U.S.C. 154(b) by 1456 days.

(21) Appl. No.: 12/111,514

(22) Filed: Apr. 29, 2008

(65) Prior Publication Data

US 2008/0300853 A1 Dec. 4, 2008

(30) Foreign Application Priority Data

May 28, 2007 (JP) ................................. 2007-140207

(51) Int. Cl.
*G06F 17/28* (2006.01)
*G10L 15/00* (2013.01)
*G06F 17/27* (2006.01)
*G06F 17/00* (2006.01)
*G10L 15/06* (2013.01)
*G06F 17/22* (2006.01)

(52) U.S. Cl.
CPC ............ *G06F 17/289* (2013.01); *G10L 15/063* (2013.01); *G06F 17/2785* (2013.01); *G06F 17/2247* (2013.01)
USPC ..................... 704/2; 704/243; 704/9; 715/234

(58) Field of Classification Search
CPC .............. G06F 17/289; G06F 17/2785; G06F 17/2247; G10L 15/063
USPC .................................. 704/2, 9, 243; 715/234
See application file for complete search history.

(56) References Cited

U.S. PATENT DOCUMENTS 5,805,911 A * 9/1998 Miller ........................... 715/234
6,873,982 B1 3/2005 Bates et al.
(Continued)

FOREIGN PATENT DOCUMENTS

JP 2000-48019 2/2000
JP 2005-521149 7/2005
(Continued)

OTHER PUBLICATIONS

Communication pursuant to Article 94(3)EPC issued Apr. 12, 2011, in Eurepean Patent Application No. 08 156 629.1-1527.

*Primary Examiner* — Farzad Kazeminezhad
(74) *Attorney, Agent, or Firm* — Oblon, Spivak, McClelland, Maier & Neustadt, L.L.P.

(57) ABSTRACT

A character input device is disclosed. The device includes a character input section including a plurality of character keys; a display section that displays an input character(s); and a next word prediction section that predicts a respective word being subsequently input in an event of input-word reception in the character input section and that displays the word as a next word candidate on the display section. The next word prediction section stores usage history information indicative of whether the next word candidate for the respective input-received word was used by a user, and determines in accordance with the usage history information of words as of a time point of the event of input-word reception of the word whether to display the next word candidate on the display section, and inhibits the display of a next word candidate when a value obtained by adding a constant to the number of used times of the candidate is smaller than the number of its unused times.

13 Claims, 10 Drawing Sheets

(56) References Cited

U.S. PATENT DOCUMENTS

| | | | |
|---|---|---|---|
| 7,716,579 B2 * | 5/2010 | Gunn et al. | 715/256 |
| 7,809,719 B2 * | 10/2010 | Furuuchi et al. | 707/723 |
| 7,912,700 B2 * | 3/2011 | Bower et al. | 704/9 |
| 2008/0122658 A1 * | 5/2008 | Salman et al. | 341/22 |

FOREIGN PATENT DOCUMENTS

| | | |
|---|---|---|
| WO | WO 03/081366 A2 | 10/2003 |
| WO | WO 2004/010326 A1 | 1/2004 |
| WO | WO 2005/036413 A1 | 4/2005 |
| WO | WO 2005/064587 A2 | 7/2005 |

* cited by examiner

FIG.5

| INPUT WORD | NEXT WORD CANDIDATE #1 | NEXT WORD CANDIDATE #2 | NEXT WORD CANDIDATE #3 | ... |
|---|---|---|---|---|
| ⋮ | ⋮ | ⋮ | ⋮ | ⋮ |
| MEETING | WITH | AT | | ... |
| ⋮ | ⋮ | ⋮ | ⋮ | ⋮ |
| WITH | ME | THE | US | ... |
| ⋮ | ⋮ | ⋮ | ⋮ | ⋮ |
| THE | GIRLS | GIRLS | FRIENDS | ... |
| ⋮ | ⋮ | ⋮ | ⋮ | ⋮ |
| GIRLS | AND | OF | | ... |
| ⋮ | ⋮ | ⋮ | ⋮ | ⋮ |
| TO | WORK | PLAN | | ... |
| ⋮ | ⋮ | ⋮ | ⋮ | ⋮ |

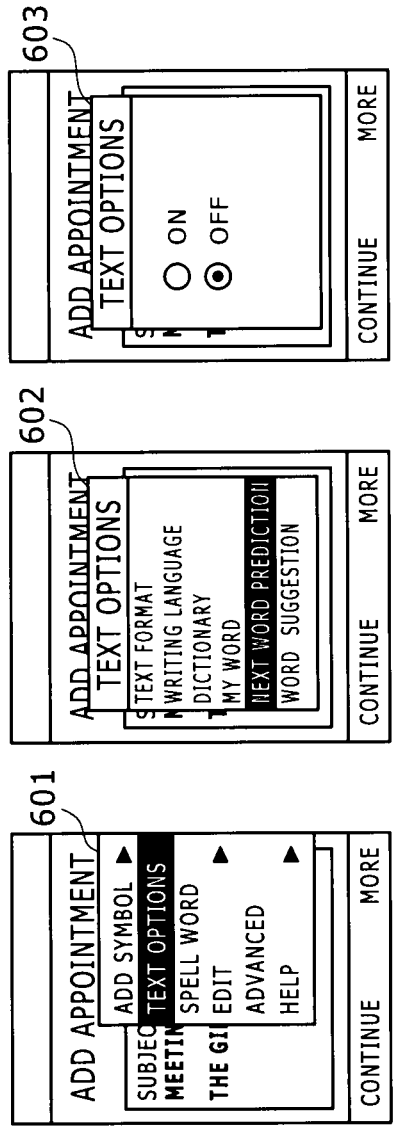

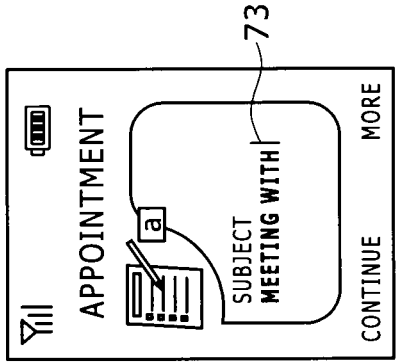
FIG.7A
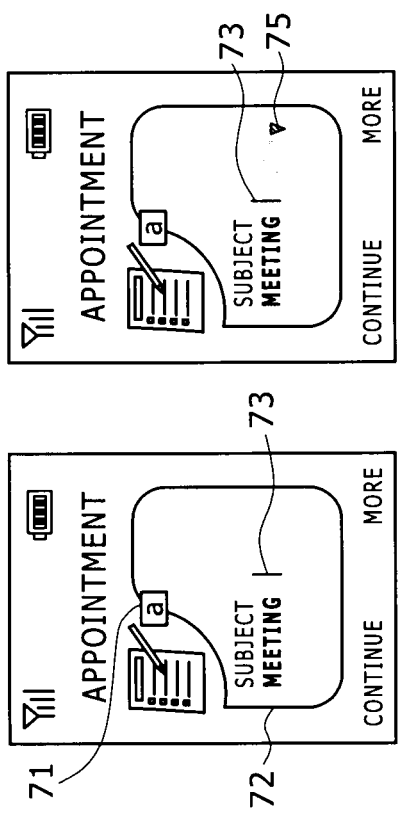
FIG.7B
FIG.7C
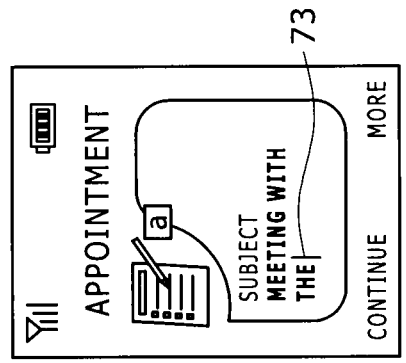
FIG.7D
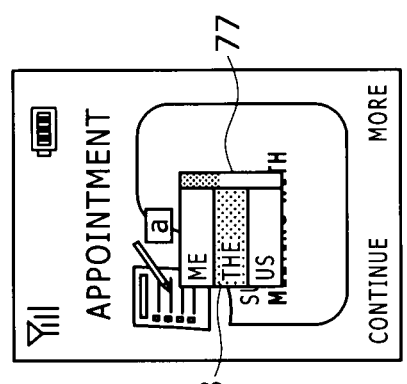
FIG.7E
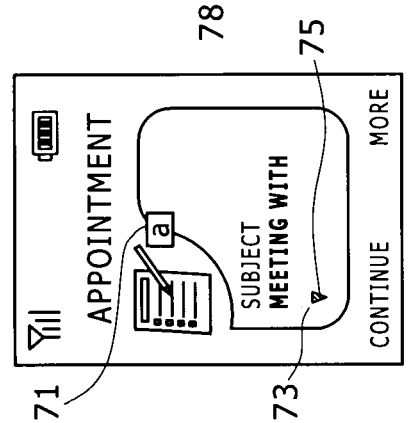
FIG.7F

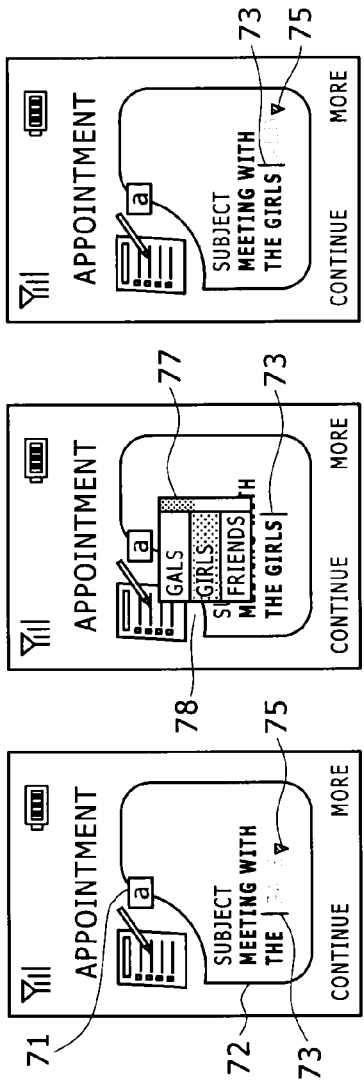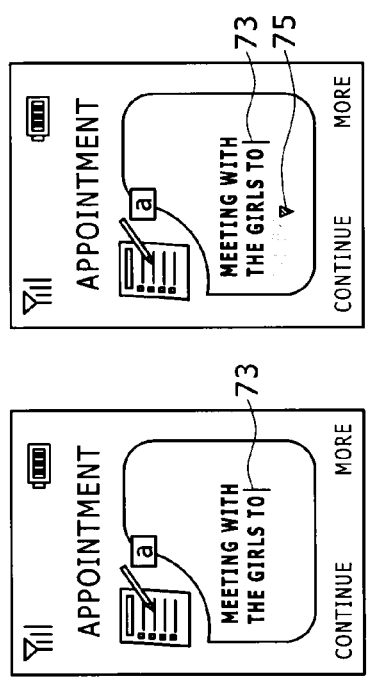

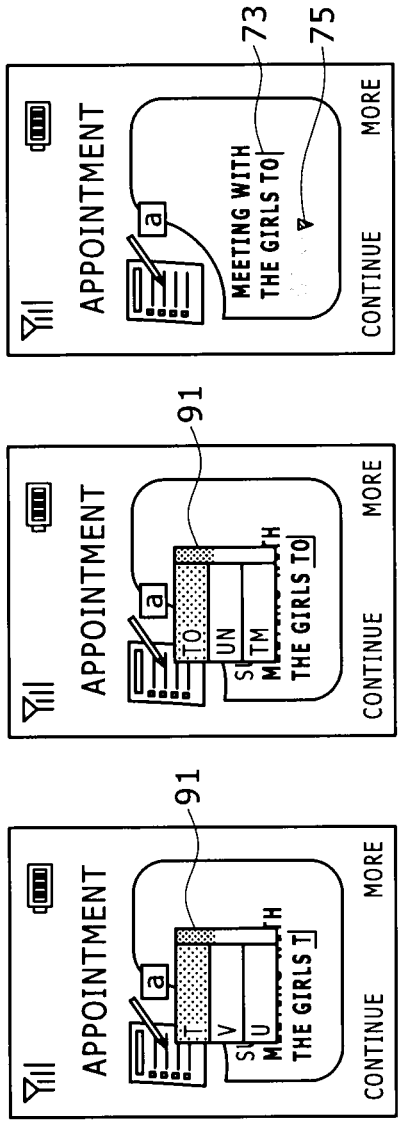

CHARACTER INPUT DEVICE AND PROGRAM FOR DISPLAYING NEXT WORD CANDIDATES BASED ON THE CANDIDATES' USAGE HISTORY

CROSS REFERENCES TO RELATED APPLICATIONS

The present invention contains subject matter related to Japanese Patent Application JP 2007-140207 filed in the Japanese Patent Office on May 28, 2007, the entire contents of which being incorporated herein by reference.

BACKGROUND OF THE INVENTION

1. Field of the Invention

The present invention relates to a character input device, a mobile terminal, and a character input program for execution of character input on a display screen by use of two or more keys.

2. Description of the Related Art

In a device, such as a mobile phone terminal, in which the number of keys usable for character input is small, generally two or more characters are allocated to one key. In this case, each time the same key is serially pressed (or, the keystroke of the same key is serially entered), a different character is presented serially or one by one as an input candidate on a display screen of the terminal on the basis of selection from among the characters allocated to the key. As such, depending upon the character, the keystroke of the key has to be repeatedly entered to input a character of interest (or, a "target character," herebelow). In other words, in order to input a single word, a user has to enter a large number of keystrokes relative to the number of characters composing the word. This is a complicated, time-consuming operation for the user.

Various approaches as solutions have been proposed to date against problems such as described above, and some of the solutions are practically used as practical applications.

One of such practical applications is known as a technique called "predicative conversion." The technique, in the event that either a character under input operation or a character string is entered or input, presents selective items corresponding to the target word predicted in accordance with past input historical log information or context on a display screen to thereby allow a user to make selection. As one of such predicative conversion techniques, "POBox" (Predictive Operation Based On example) is known ("POBox" is a registered trademark of Sony Corporation).

As one of other input techniques, a so-called single-tap technique is known. According to this technique, by serially entering keystrokes of keys to each of which a target character is allocated, a word associated to the keystrokes of the keys and stored in a dictionary is retrieved and presented as a selective item to the user.

Also known is a next word prediction technique in which, in a device, past input history information for predicting a next word desired to be input after a certain word has been input are stored. Thereby, when the certain word is input, a word to be input next ("next word," herebelow) is predicted in accordance with the input history information, and the predicted word is presented as a selective item to a user.

SUMMARY OF THE INVENTION

The present invention relates to improvement of a next word prediction technique such as described above. However, the existing next word prediction technique is based on input history information of a pair of words successively input by a user in the device, and poses problems as described below.

In the event that a next word prediction function is active or in an on state, when a subsequent word to a certain word is stored, the "next word" is predicted and displayed as a selective item on a screen each time the "certain word" is input. However, when the user attempts to input a word different from a word input in the past in succession to the "certain word," the selective item displayed is annoyance and obstructive.

When the next word prediction function is turned off, while the troublesome is cancelled, next word prediction cannot be used at all in such a case.

Actually, depending on the case, the next word prediction function is necessary or unnecessary for a user. However, in the case where the next word prediction function is required to be switched on/off by the user each time during character input, the operation of the on/off switching is rather burdensome, such that the operation is not realistic.

Under these circumstances, it is intended to provide a technique in which, in an character input device, automatic on/off switching of a next word prediction function is executed in response to a history of operations of a user and the switching is executed to meet an intention of the user as much as possible.

According to one embodiment of the present invention, a character input device includes a character input section including a plurality of character keys; a display section that displays an input character(s); and a next word prediction section that predicts a respective word being subsequently input in an event of input-word reception in the character input section and that displays the word as a next word candidate on the display section. The next word prediction section stores usage history information indicative of whether the next word candidate for the respective input-received word was used by a user, and determines in accordance with the usage history information of words as of a time point of the event of input-word reception of the word whether to display the next word candidate on the display section.

According to the embodiment, even when the next word prediction section (corresponding to the next word prediction function described above) is used, next word candidates are not displayed at all times in a fixed manner. However, the next word candidates are displayed on the display section in accordance with user's past usage historical logs of the next word candidates, and are inhibited from being displayed on the display section, for example. By use of such past usage historical logs of the same user, a next word candidate for a word with a high next word candidate use frequency is displayed on the display section, but a word with a low next word candidate use frequency is inhibited from being displayed on the display section. Thereby, the next word candidate usage probability of the user can be determined with a relatively high accuracy. In this manner, when it is determined from a past usage historical log that the user is not likely to use a next word candidate, the next word is inhibited from being displayed on the display section. As a consequence, complexity resulting from all-time automatic display of next word candidates to the user is avoided. On the other hand, when it is determined that the user is likely to use a next word candidate, the next word candidate is automatically presented to the user.

Even when display of a next word candidate is inhibited, the next word candidate is displayed in response to the predetermined specification of the user. Thereby, even when the result of prediction in accordance with the past usage historical log does not match exactly with a request, an appropriate countermeasure can be provided.

The configuration of the character input device may be such that, when a numeric value of the number of used times of the next word candidate is smaller than a numeric value of the number of unused times of the next word candidate, the next word prediction device inhibits display of the next word candidate. In this case, the degree of displayability of the next word candidate is adjusted.

According to another embodiment of the present invention, a mobile terminal includes a character input section including a tenkey section wherein a plurality of characters are allocated to one character key; a display section that displays an input character(s); and a next word prediction section that predicts a respective word being subsequently input in an event of input-word reception in the character input section and that displays the word as a next word candidate on the display section. The next word prediction section stores usage history information indicative of whether the next word candidate for the respective input-received word was used by a user, and determines in accordance with the usage history information of words as of a time point of the event of input-word reception of the word whether to display the next word candidate on the display section. The operation of the mobile terminal is similar to the operation of the character input device described above.

According to still another embodiment of the present invention, there is provided a character input program that is executed in a device including a character input section including a plurality of character keys, and a display section that displays an input character(s). The program causes a computer to execute steps including configuring a next word candidate database in a manner that, each time a word is input by the character input section, a next word input in succession to the word is stored in correlation therewith; storing next word candidate history information containing a number of used times of a next word candidate for the input word and a number of unused times of the next word candidate; when the next word candidate database is referenced each time a word is input, and the input word is thereby recognized to be a word stored in the next word candidate database, determining whether to display a next word candidate(s) for the word on the display section in accordance with the next word candidate history information; updating the next word candidate history information in regard to the input word; and displaying the next word candidate(s) on the display section when the next word candidate is determined to be displayed on the display section.

According to the embodiments of the present invention, in the character input device, ON/OFF switching of the next word prediction function (next word prediction section) does not have to be carried out by the user in accordance with the user's operation history. However, according to the embodiments, when the probability of requiring next word prediction is high, the next word candidate display is automatically performed; however, when the probability is not high), the next word candidate display can be inhibited. Consequently, a character input operation excellent in usability for users can be realized.

BRIEF DESCRIPTION OF THE DRAWINGS

In the accompanying drawings:

FIG. 5 is a view showing an example of the general contents of a next word candidate database in the embodiment of the present invention;

FIGS. 6A to 6C, respectively, are views showing examples of setting screens that are used for ON/OFF setting of a next word prediction function in the embodiment of the present invention;

FIGS. 7A to 7F, respectively, are views of examples of screen transitions of character input on a mobile terminal in the embodiment of the present invention;

FIGS. 8A to 8E, respectively, are views of examples of screen transitions continued from the screen of FIG. 7F;

FIGS. 9A to 9C, respectively, are examples of screen transitions in the case where a single-tap input technique is employed in the event the user inputs the word "to" on the screen of FIG. 8D.

DETAILED DESCRIPTION OF THE PREFERRED EMBODIMENT

A preferred embodiment of the present invention will be described herebelow with reference to the accompanying drawings.

Figure 1:
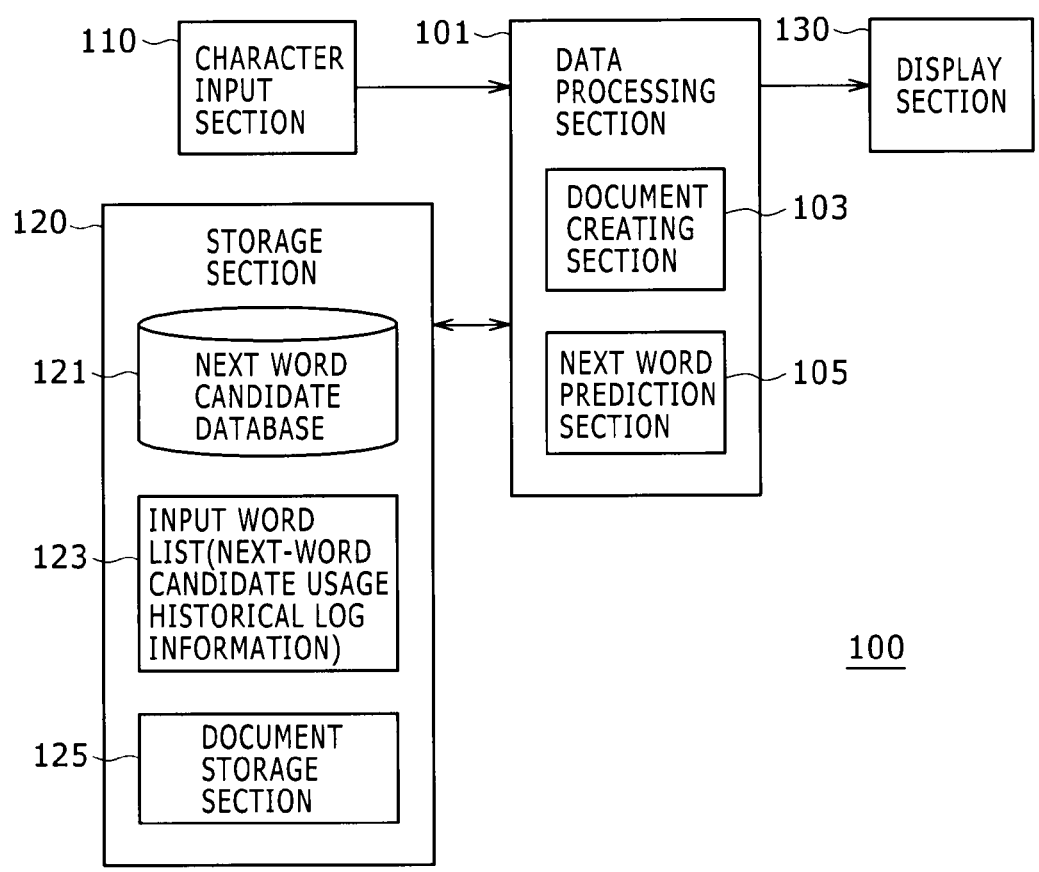
FIG. 1 is a schematic block diagram showing a general configuration of a character input device of one embodiment of the present invention.

FIG. 1 is a schematic block diagram showing a general configuration of a character input device 100 of one embodiment of the present invention. The character input device 100 includes at least a data processing section 101, a character input section 110, a storage section 120, and a display section 130.

The data processing section 101 is a control section as a CPU (central processing unit) that provides control of devices through program control. As major functions in the present embodiment, a document creating section 103, and a next word prediction section 105 are provided (a "word" hereinbelow will represent a "word or phrase").

The character input section 110 provides an input interface through which a user inputs, for example, instructions and information, into the character input device 100. The character input section 110 includes at least multiple keys (inclusive of tenkeys) and various control keys.

The storage section 120 is a section that stores therein, for example, an OS (operating system) and programs, such as various applications, which are executed by the CPU 101, and various types of data. The storage section 120 can include storage mediums, such as a ROM (read-only memory), a flash ROM, a RAM (random access memory), and an HDD (hard disk drive). In the present example, the storage section 120 includes, for example, a next word candidate database 121, next-word candidate usage historical log information 123, and a document storage section 125. The storage section 120 can further include a dictionary containing therein words, for example.

The display section 130 provides a display interface that presents information to the user by way of a display screen. The display section 130 is inclusive of, for example, an LCD (liquid crystal display) or a display device of an organo-EL (electroluminescence), and a display control circuit therefor.

In general, in the present invention, the word refers to one semantic unit composed of one or more (multiple) characters; and more specifically, in the present embodiment, the word corresponds to a word (as such, the "word" will be simply referred to as "word," herebelow).

In input of text, such as English text using characters of the alphabet, a word is written in a segmentation manner. More specifically, a word-to-word portion is segmented with a space. The manner for space insertion is not specifically limited. For example, normally, the portion of one word of a character string of the alphabet is not known to the terminal, such that a space is inserted corresponding to a predetermined operation of the user, such as an operation (pressing a "#" key, for example) of moving, for example, a cursor 73 to the input position of the next word respective phase. Alternatively, however, when a specific operation for confirming one word is carried out, the space can be automatically inserted. For example, when the operation of confirming one word, such as an operation of input of a symbol such as period, comma, colon, or semicolon, or an operation of selection of a word candidate in the event of a word prediction change is carried out, the space may be automatically input after the word.

Figure 2:
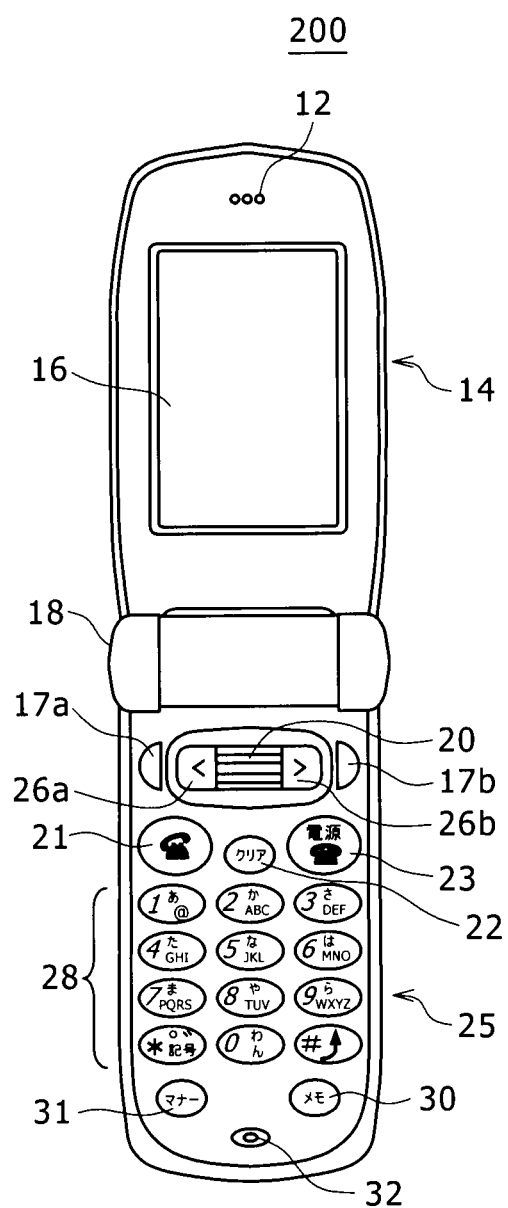
FIG. 2 is a view showing an exterior of a mobile phone terminal as one example of the character input device shown in FIG. 1.

FIG. 2 shows an exterior of a mobile terminal 200 as one example of the character input device 100 of the embodiment of the present invention. In the present example, there is shown the mobile terminal 200, which is a so-called foldable or flip type mobile terminal, but the present invention is not limited thereby. For example, the terminal type may be any one of, for example, straight-bar and slidable types. FIG. 2 is a front view of the foldable-type mobile terminal 200 in an open state.

The mobile terminal 200 includes a hinge portion 18 and an upper housing 14 and a lower housing 25 that are coupled to be openable or closable around the hinge portion 18. FIG. 2A is a view of the mobile phone in an open state as viewed from an inner surface side (side of surfaces mated with one another in the close state); and FIG. 2B is a view of the mobile phone in the open state as viewed from the outer surface side. A speaker 12 is disposed in an upper portion of an inner face of the upper housing 14, and a display section 16 (corresponding to the display section 130 of FIG. 1) is disposed on an inner major face.

On an inner face of the lower housing 25, a jog dial 20, which is rotatable pressing switch, is disposed in the center of an upper portion. In addition, left and right keys 26a and 26b are disposed in two end portions of the jog dial 20, and soft keys 17a and 17b are disposed in two side portions of the left and right keys 26a and 26b. A communication key 21, a clear key 22, and a power/on-hook key 23 are disposed below the above-described operation keys. Further, below these keys there is disposed tenkey section 28 (corresponding to the character input section 110 of FIG. 1), and below these keys, there are disposed a memo key 30 and a manner key 31 are disposed. A microphone 32 is disposed in the lowest portion of the lower housing 25.

The detail configuration as described above is only an example for description purposes, and the present invention is not limited thereby. For example, in the mobile terminal 200 of the present embodiment, input of characters of the alphabet is primarily performed, so that the mobile terminal 200 may be of a type that support input of alphabet character and does not support input of kana characters (Japanese).

Figure 3:
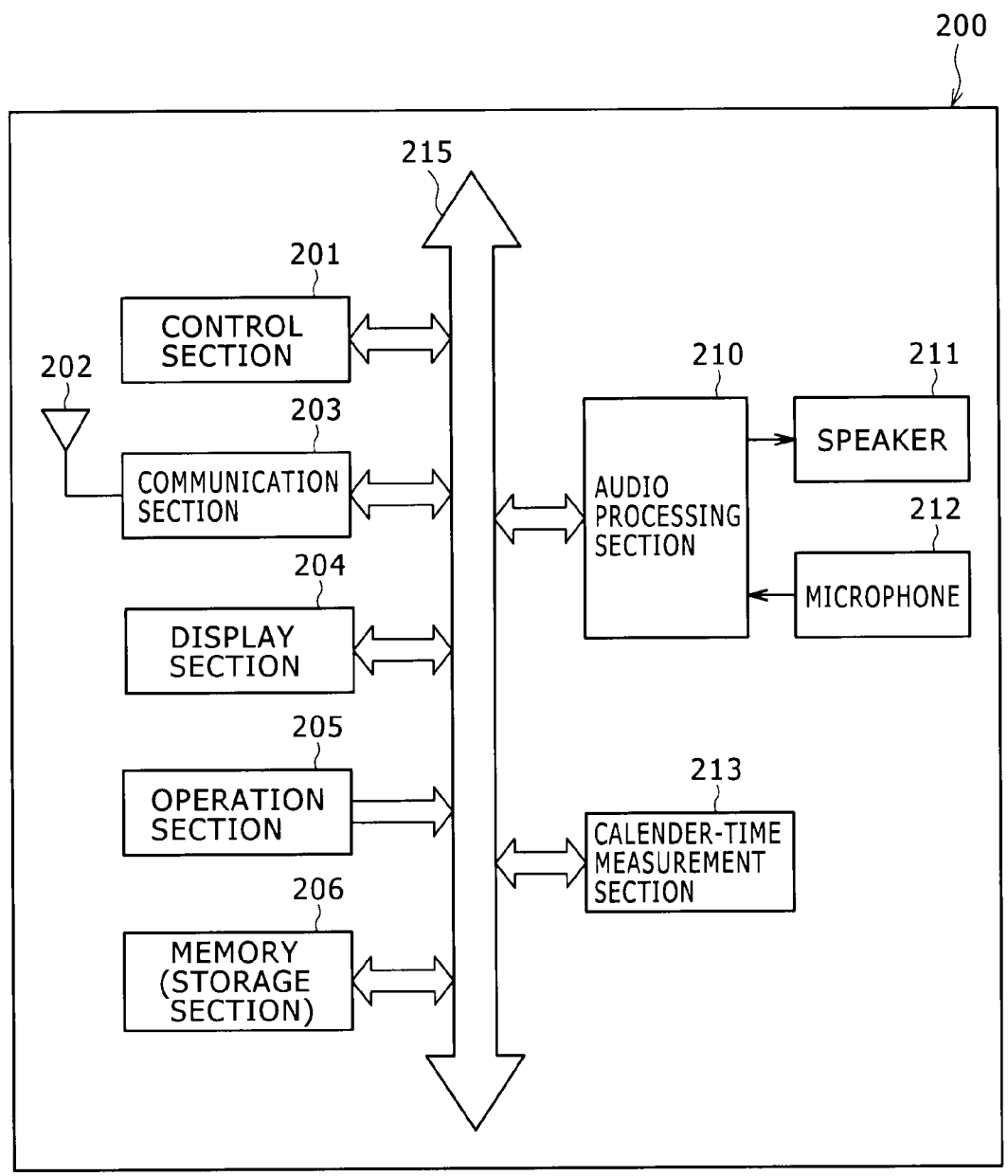
FIG. 3 is a block diagram showing a general hardware configuration of the mobile terminal shown in FIG. 2.

FIG. 3 is a block diagram showing a general hardware configuration of the mobile terminal 200 shown in FIG. 2.

The mobile terminal 200 includes components interconnected via a bus 215. The components are a control section 201, a communication section 203, a display section 204, an operation section 205, a memory 206 (storage section), an audio processing section 210, a speaker 211 connected to the audio processing section 210, a microphone 212, and a calender-time measurement section 213.

The control section 201 corresponds to the data processing section 101 of FIG. 1, and includes, for example, a CPU to thereby control the respective sections of the mobile terminal 200. The communication section 203 includes, for example, an RF section and a modulation circuit, thereby to effect wireless or RF communication with a base station via an antenna 202 for telephonic communications, mail data, and Web data, for example.

The display section 204 corresponds to the display section 130 of FIG. 1 and the display portion 16 of FIG. 2, as described above.

The operation section 205 corresponds to the character input section 110 of FIG. 1, and includes the various keys, such as tenkeys, of FIG. 2. The operation section 205 receives, for example, instructions and data inputs from the user.

The memory 206 (storage section) corresponds to the storage section 120 of FIG. 1, and includes, for example, an ROM and a RAM. The memory 206 (storage section) stores therein an OS and programs such as various applications that the CPU executes, and various types of data. The ROM can include a rewritable nonvolatile memory, such as a flash memory.

The audio processing section 210 includes, for example, a voice encoder, a voice decoder, a D/A (digital to analog) converter, and an A/D (analog to digital) converter. The audio processing section 210 performs audio output to the speaker 211 (including an earphone) and audio input from the microphone 212.

The calender-time measurement section 213 provides, for example, current date and time information and a calender function in accordance with an RTC (realtime clock).

Although not shown, the mobile terminal 200 includes other functional sections, such as a power supply section, light emitting section, and vibrator, similarly as general mobile phone terminals. The mobile terminal 200 may further include a camera section and a contactless IC (integrated circuit) card functional section.

Figure 4:
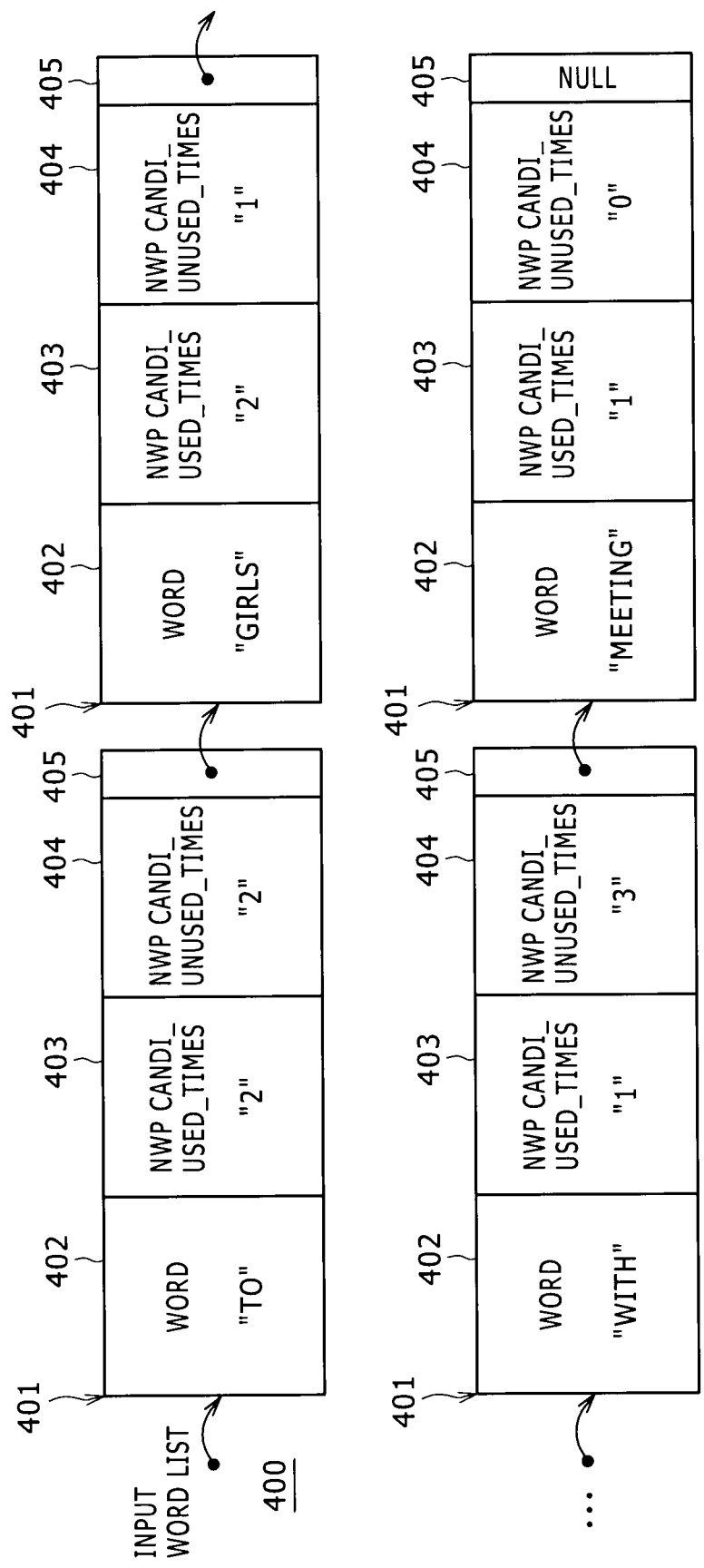
FIG. 4 is a view showing an example of a structure of an input word list of words input by a user as history information in one embodiment of the present invention.

FIG. 4 is a view showing an example of a structure of an input word list 400 that is used as input history information of pairs of words successively input by the user in the past. The input word list 400 corresponds to the next-word candidate usage historical log information 123 shown in FIG. 1. The input word list 400 is formed in the manner that a node 401 is generated in units of a word input past, and respective nodes 401 thus generated are coupled together. The "word input in the past" refers to a word confirmed, such that a word unselected while presented as a next word candidate is not included into the category of "word input in the past." Each node 401 is composed of a word 402 ("Word"), a number of used times 403 (NWP Candi_used_times), a number of unused times 404 (NWP Candi_unused_times), and a pointer 405. The word 402 is a word input in the past. The number of used times 403 is the number of times a next word candidate (or, any one of multiple next word candidates, if any) for the word has been used. The number of unused times 404 is the number of times a next word candidate (or any one of multiple next word candidates, if any) for the word has been unused. The pointer 405 points or indicates a top of a next node 401. The number of times the next word candidate has been used and the number of times the next word candidate has been unused will hereinbelow are referred to as "number of used times" and "number of unused times," respectively.

The input history information is acquired in accordance with an existing technique, such that a practical technique for acquiring the log information is not limited by the present invention. Further, as words for prediction of next words, all words are not necessarily be targeted, but the words may be limited to either only words stored in a dictionary or predetermined ones thereof.

Next word candidates for respective words 402 are stored in the next word candidate database 121. The next word candidate database 121 itself is of the type commonly known, but the structure thereof is not specifically limited by the present invention. FIG. 5 shows an example of the general contents of the next word candidate database 121. The next word candidate database 121 stores therein a word input in succession to an input word 501 in correlation therewith as a next word candidate 502. While the number of next word candidates 502 is preferably a multiple number, an upper limit number may be preliminarily set. In this case, in the event that a new next word candidate is added after next word candidates have been stored to the upper limit number, a next word candidate with a low priority in a predetermined order of priority is erased. According to the predetermined order of priority, for example, a next word candidate corresponds to a word that is used least recently or at an oldest time most or having a lowest use frequency. In a method where the method of use frequency is used, information of the number of use times or use frequency is retained or stored. Alternatively, the method may be such that priority levels are provided to respective ones of multiple next word candidates for an input word 501, and the respective next word candidates are sequentially presented to the user in that order of priority levels. More specifically, in the event that multiple next word candidates are present, a next word candidate with high priority level is arranged on a side where a highlight presentation, such as a cursor used for selection of a next word candidate, is set by default.

The next word prediction function of the present embodiment can be selectively set on/off. FIGS. 6A to 6C, respectively, show examples of setting screens that are used for on/off setting of the next word prediction function. More specifically, FIG. 6A shows a mode in which an operation menu 601 is displayed. FIG. 6B shows a mode in which a submenu 602 is displayed when "Text-input related setting options (Text options)" is selected by the user on the operation menu 601. FIG. 6C shows a mode in which an On/Off Setting Menu 603 of the next word prediction function is displayed when "Next word prediction" is selected on the submenu 602. On the screen, when not desiring to use the next word prediction function, the user selects "Off." Alternately, when desiring the next word prediction function, the user selects "On." However, as described further below, a case can occur depending on the situation in which even when "On" is selected, the next word prediction function is inhibited.

FIGS. 7A to 7F and 8A to 8E, respectively, are views of examples of screen transitions of character input on the mobile terminal 200 in the embodiment. In the respective examples, a specification screen for an appointment is shown. An application employing the present invention is not limited to the example application for specification of the appointment, but any one of arbitrary applications for, for example, e-mail, word processing, memo, schedule, telephone directory applications, which utilize character inputs.

On the respective shown screen, "a" displayed above a document input field 72 is indicative that an alphabet input mode is currently selected. In FIG. 7A, the screen indicates a mode in which when, after input the word or phrase (the word in the present case) "Meeting" through the operation of the operation section 205, the user has performed the operation of moving the cursor 73 to an input position of a next word, the next word candidate "with" is automatically displayed, as shown in FIG. 7B, in accordance with past input historical logs. At this time point, however, since not confirmed by the user, the word candidate is displayed in a display mode displaying the word different from a normal word (with a brightness level lower than a normal brightness level).

In the present example, as shown in the next word candidate database 121 of FIG. 5 generated in accordance with the past input history information, the words such as "with" and "at," were input after the word "Meeting" in the past. In this case, of these input words, "with" having the highest priority level such as described above is automatically selected by the terminal as the next word candidate.

In the present embodiment, the next word prediction function is not inhibited when the number of used times (NWP Candi_used_times) of the next word candidate in the past is larger than or equal to the number of unused times (NWP Candi_unused_times) of the next word candidate in the past, the next word prediction function is exhibited when the number of used times is smaller than the number of unused times. As shown in an example of FIG. 4, in regard to the word "Meeting", the number of used times (NWP Candi_used_times) of the next word candidate in the past is larger than the number of unused times (NWP Candi_unused_times) of the next word candidate in the past. Consequently, the next word candidate display is not inhibited.

With reference to FIG. 7B, a downwardly pointing triangle mark (or arrow mark), that is, a reverse triangle mark 75, is displayed immediately after the word "with." This is indicative that other next word candidates are present, and multiple next word candidates (described further below by reference to FIG. 7E) will be displayed if the user carries out a downward specification operation on the operation section. In the example, since the word "with" matches a word intended to be input by the user, the user confirms the word by carrying out a predetermined operation (with a press or keystroke of an enter key). Then, as shown in FIG. 7D, the cursor 73 is moved to the input position for a next word by a predetermined operation, such as entry of a keystroke of the "#" key. In this regard, the operational configuration may be such that that a keystroke of the "#" key concurrently represents the confirmation of the next word candidate "with" and the input of the space. Further, the operational configuration may be such that the reverse triangle mark 75 is not displayed when the number of next word candidates is only one.

With reference to FIG. 7D, in regard to the work "with," as shown in an example of FIG. 4, the number of used times (NWP Candi_used_times) of the next word candidate in the past is smaller than the number of unused times (NWP Candi_unused_times) of the next word candidate in the past. Consequently, the next word candidate display is inhibited. However, even in this event, the reverse triangle mark 75 is displayed immediately after the cursor 73, whereby, if desired, the user can display a hidden next word candidate(s) by carrying out a downward specification operation. On the screen of FIG. 7D, the hidden next word candidates are displayed in the form of a popup menu 77 as shown in FIG. 7E. In the event that a target word is present in the popup menu 77, when the user selects the target word by moving a word selection cursor 78 onto the target word, the selected next word candidate "the" is confirmed, as shown in FIG. 7F.

FIG. 8A shows a mode in which, when the space is input immediately after the word "the," the next word candidate "gals" therefor is displayed. Suppose now that the next word candidate is not desired and hence the user has carried out a downward specification operation with the reverse triangle mark 75 to verify an other next word candidate. In this event, as shown in FIG. 8B, the popup menu 77 is displayed. When the next word candidate "girls" is selected in the popup menu 77 and the space is input by the user, then, as shown in FIG. 8C, the word "and" is displayed as a next word candidate for the word "girls". As shown in an example of FIG. 4, in regard to the word "girls," the number of used times (NWP Candi_used_times) of the next word candidate in the past is larger than the number of unused times (NWP Candi_unused_times) of the next word candidate in the past. Consequently, the next word candidate display is not inhibited.

On the screen of FIG. 8C, suppose that in the event that a word the user intends to input in succession to the word "girls" is not "and," and display of an other next word candidate is not desired. In this case, as shown in FIG. 8D, a word ("to" in the example) the user desires to input is input from the operation section 205. Thereby, the next word candidate "and" is erased, and the word "to" is instead input (displayed). Such an operation of erasure of a next word candidate by inputting a new word can be applied even in such a state where multiple next word candidates are displayed through the downward specification operation. FIG. 8E shows a mode in which "work" is displayed as a next word candidate for the word "to" through input of the space immediately after the word "to." In this case also, the number of used times (NWP Candi_used_times) of the next word candidate in the past is larger than or equal to the number of unused times (NWP Candi_unused_times) of the next word candidate in the past. Consequently, the next word candidate display is not inhibited.

In the present invention, the method of inputting one word is not specifically limited. For example, the method may be such that, in the event the user inputs a word, all characters of the alphabet composing the word may be input one by one or may be input by using either an existing word predication technique or single-tap input technique.

FIGS. 9A to 9C, respectively, are examples of screen transitions in the case where a single-tap input technique is employed in the event the user inputs the word "to" on the screen of FIG. 8D. More specifically, FIG. 9A shows a display example in the event that the user entered a keystroke of a key representing numeric value "8" (i.e., "8" key) of the tenkeys of the mobile terminal 200. In this event, a popup menu 91 including alphabet characters "t," "v," and "u" allocated to the key as selection candidates is displayed. FIG. 9B shows a display example in the event that the user subsequently entered a keystroke of a "6" key of the tenkeys after the state shown in FIG. 9A. In response to the keystrokes of the respective two tenkeys, the mobile terminal 200 displays in the popup menu 91 word candidates that can be acquired in accordance with combinations of characters allocated to the respective keys. In the present example, a respective "word" of two alphabet characters is shown. In the case where a further keystroke of a tenkey is successively entered, a dictionary of predetermined words is referenced, words respectively including character strings coupled with the displayed alphabet characters can be retrieved and displayed on the screen as selectors.

FIG. 9B shows an example in the event that the user selected the word "to" from the selective items in the popup menu 91. In this event, as shown in FIG. 9C, the next word prediction function works. This corresponds to the screen transitions of FIGS. 8D to 8E.

Figure 10:
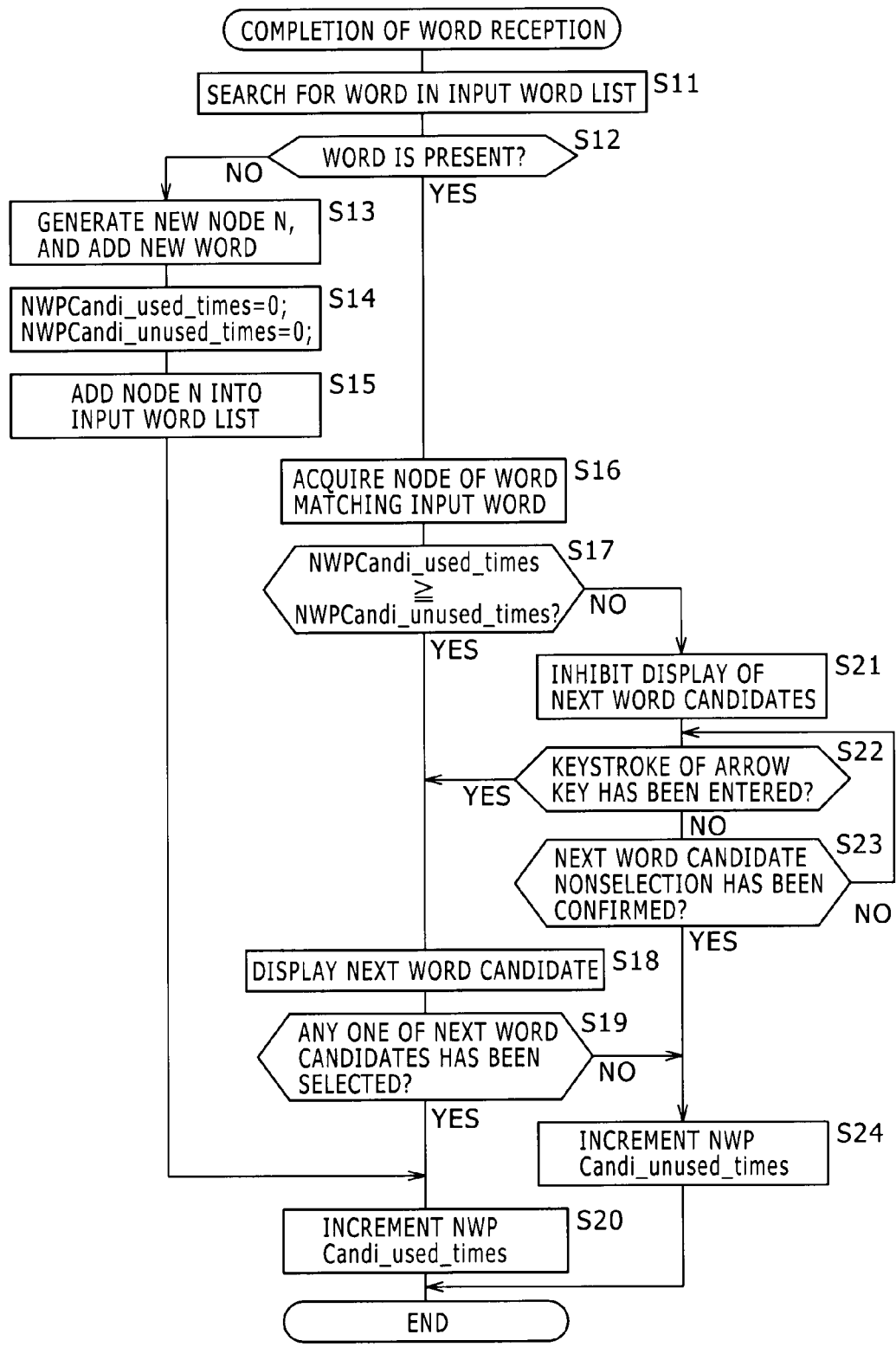
FIG. 10 is a flow diagram of a process that is executed by a data processing section that realizes an example of the operation of the next word prediction function (shown in FIG. 1) in the embodiment of the present invention.

FIG. 10 shows a flow diagram of a process that is executed by the data processing section 101 (FIG. 1) to thereby realize the operation of the next word prediction function as exemplified in the present embodiment. The process is execution upon completion of one word reception. One word reception is completed either upon completion of input of the space after input of a character string, i.e., a string of consecutive characters as explained above, or upon completion of an operation producing an result equivalent to the result of input of the space followed by the character string.

To begin with, a search operation that verifies whether an input word is present in an input word list 400 as shown in FIG. 4 is executed (step S11). If the word is not present in the input word list 400 (step S12: No), then a new node N (401 in FIG. 4) is generated, and a new word is added into the node N (step S13). Then, the number of used times 403 (NWP Candi_used_times) and number of unused times 404 (NWP Candi_unused_times) of the next word candidate in the node N is initialized to "0" (step S14), the node N is added into the input word list 400, and then the process ends.

If at step S12 it has been verified that the word is present (i.e., step S12: Yes), then a node of the word matching with the input word is acquired (step S16). Then, a comparison is made between the number of used times 403 (NWP Candi_used_times) and number of unused times 404 (NWP Candi_unused_times) of the node (step S17).

If the number of unused times 404 (NWP Candi_unused_times) is larger than the number of used times 403 (NWP Candi_used_times), the next word candidate display is inhibited (step S21). Thereafter, when next word candidate nonselection is confirmed (step S23: Yes), then the number of unused times 404 (NWP Candi_unused_times) is incremented (step S24). Then, the process of FIG. 10 ends. The next word candidate nonselection is confirmed either in the event that, for example, input of a character (inclusive of a period or the like) for a next word is started by the user with selection of neither a next word candidate nor an arrow key.

Subsequent to step S21, in the event that a keystroke of the arrow key (pointing downward, in the present example) is entered (step S22: Yes), a next word candidate is displayed (step S18). That is, even in the event that at step S17 the number of used times 403 (NWP Candi_used_times) is larger than or equal to the number of unused times 404 (NWP Candi_unused_times) (i.e., step S17: Yes), a next word candidate is displayed (step S18). Although not shown, in a next word candidate process of step S18, a first word is displayed first, and then an other next word candidate(s) is displayed in accordance with an explicit specification (a keystroke of the downward arrow key, in the present example) entered by the user.

Subsequent to step S18, if any one of the displayed next word candidates is selected by the user (step S19: Yes), the number of used times 403 (NWP Candi_used_times) is incremented (step S20), and the process of FIG. 10 ends.

As described above, it is determined in accordance with the determination expression at step S17 whether the number of used times 403 (NWP Candi_used_times) is larger than or equal to the number of unused times 404 (NWP Candi_unused_times). However, a determination expression using one of the parameters of the number of times to which a constant C is added may instead be used. More specifically, the following expression may be used:

NWP Candi_used_times+C>NWP Candi_unused_times? In this case, the constant C is an integer. When the constant C is a positive integer, the next word candidate is likely to be displayed (in other words, display of the next word candidate is less likely to be inhibited). Conversely, when the constant C is a negative integer, the next word candidate is less likely to be displayed (in other words, display of the next word candidate is likely to be inhibited). The arrangement may be such that the user is permitted to directly or indirectly specify the constant C. The indirect specification is enabled in such a manner that, for example, multiple degrees of next word candidate displayability are provided to permit the user to select a degree of the displayability, and the numeric value of the constant C corresponding to the degree of displayability. With the constant C employed in the determination expression, the degree of the next word candidate displayability can be adjusted.

As above, while the preferred embodiment of the present invention has been described, various modifications and alterations can be made in addition to those described above.

For example, according to the preferred embodiment, in the event of next word candidate display for a certain input word, even when multiple next word candidates are present, only one next word candidate is first displayed, and other next word candidates are displayed in response to the request of the user. However, the operational configuration may be such that the multiple next word candidates (if present) are directly displayed.

While the character input device has been described with reference to the mobile phone terminal as an adaptation example, the character input device can be adapted to various other devices, such as fixed phone terminals and mobile terminals such as PDAs (personal digital assistants).

While the present invention is well suited for use in devices with a limited number of character keys, adaptation to devices having a so-called full keyboard is not excluded from the applicability of the invention.

Although only the alphabet characters have been described as word-composing characters, application to, for example, the Japanese kana and kanji characters is not excluded from the applicability of the present invention.

In the embodiment and examples, description has been made based on the contemplation that the keys as hardware keys, but the keys may be software keys allocated over a touchpanel.

While the shapes and constructions of the individual portions are described and shown in detail with reference to the embodiment and examples, they are merely practical examples for carrying out the present invention, so that they should not be construed as limiting the technical scope of the invention.

What is claimed is:

1. A character input device, comprising:
a character input section including a plurality of character keys;
a display section that displays an input character(s); and
a next word prediction section that predicts a respective word being subsequently input in an event of input-word reception in the character input section and that displays the word as a next word candidate on the display section, the next word prediction section predicting the respective word before any part of the respective word is input in the character input section,
wherein the next word prediction section stores usage history information indicative of whether the next word candidate for the respective input-received word was used by a user, and determines in accordance with the usage history information of words as of a time point of the event of input-word reception of the word whether to display the next word candidate on the display section, the usage history information includes a number of used times of the next word candidate and a number of unused times of the next word candidate for the respective input-received word,
the next word prediction section determines whether to display the next word candidate on the display section in accordance with the result of a comparison between the number of used times of the next word candidate and the number of unused times of the next word candidate and when a value obtained by adding a constant to the number of used times of the next word candidate is smaller than a value of the number of unused times of the next word candidate, the next word prediction section inhibits display of the next word candidate.

2. The character input device as claimed in claim 1, wherein, when a value of the number of used times of the next word candidate is smaller than a value of the number of unused times of the next word candidate, the next word prediction section inhibits display of the next word candidate.

3. The character input device as claimed in claim 2, wherein, even when the display of the next word candidate is inhibited, the next word prediction section displays the next word candidate on the display section in response to a predetermined specification of the user.

4. The character input device as claimed in claim 2, wherein when a plurality of next word candidates for a certain word are present and when any one of the plurality of next word candidates had been used, the next word prediction section determines that the next word candidate was used.

5. The character input device as claimed in claim 1, wherein, when determined to display the next word candidate in a case where a plurality of next word candidates are present, the next word prediction section displays a single next word candidate having a high priority level on the display section.

6. The character input device as claimed in claim 5, wherein, in a state where the single next word candidate is being displayed on the display section, the next word prediction section displays either another next word candidate or all the next word candidates on the display section in response to a predetermined specification of the user.

7. The character input device as claimed in claim 5 or 6, wherein, when an input of a new character is received from the character input section in a state where the next word candidate(s) is being displayed on the display section, the next word prediction section erases the display of the next word candidate(s), and displays the received character on the display section.

8. The character input device as claimed in claim 1, wherein the next word prediction section further comprises a storage section storing therein next word candidate data containing therein a subsequently input word as a next word candidate for the respective input-received word.

9. The character input device as claimed in claim 1, wherein the character input section includes a tenkey section wherein a plurality of characters are allocated to one character key.

10. The character input device as claimed in claim 1, wherein the character is an alphabet character, and the respective word is composed of alphabet characters.

11. The character input device as claimed in claim 1, wherein when a plurality of next word candidates for a certain word are present, the next word prediction section displays at least some of the plurality of the next word candidates.

12. A mobile terminal, comprising:
a character input section including a tenkey section wherein a plurality of characters are allocated to one character key;
a display section that displays an input character(s); and
a next word prediction section that predicts a respective word being subsequently input in an event of input-word reception in the character input section and that displays the word as a next word candidate on the display section, the next word prediction section predicting the respective word before any part of the respective word is input in the character input section, wherein the next word prediction section stores usage history information indicative of whether the next word candidate for the respective input-received word was used by a user, and determines in accordance with the usage history information of words as of a time point of the event of input-word reception of the word whether to display the next word candidate on the display section, the usage history information includes a number of used times of the next word candidate and a number of unused times of the next word candidate for the respective input-received word, the next word prediction section determines whether to display the next word candidate on the display section in accordance with the result of a comparison between the number of used times of the next word candidate and the number of unused times of the next word candidate and when a value obtained by adding a constant to the number of used times of the next word candidate is smaller than a value of the number of unused times of the next word candidate, the next word prediction section inhibits display of the next word candidate.

13. A non-transitory computer readable medium encoded with computer executable instructions for causing a computer to function as a device including a character input section including a plurality of character keys, and a display section that displays an input character(s), the computer executable instructions causing the computer to implement a method comprising:

configuring a next word candidate database in a manner that, each time a word is input by the character input section, a next word input in succession to the word is stored in correlation therewith;

storing next word candidate history information containing a number of used times of a next word candidate for the input word and a number of unused times of the next word candidate;

when the next word candidate database is referenced each time a word is input, and the input word is thereby recognized to be a word stored in the next word candidate database, predicting a next word candidate(s) for the input word and determining whether to display the next word candidate(s) for the input word on the display section in accordance with the next word candidate history information, the predicting step predicting the next word candidate(s) before any part of the next word candidate(s) is input in the character input section;

updating the next word candidate history information in regard to the input word;

displaying the next word candidate(s) on the display section when the next word candidate is determined to be displayed on the display section and when a value obtained by adding a constant to the number of used times of the next word candidate is smaller than a value of the number of unused times of the next word candidate, inhibiting display of the next word candidate.

* * * * *

UNITED STATES PATENT AND TRADEMARK OFFICE
CERTIFICATE OF CORRECTION

| | | |
|---|---|---|
| PATENT NO. | : 8,712,756 B2 | Page 1 of 1 |
| APPLICATION NO. | : 12/111514 | |
| DATED | : April 29, 2014 | |
| INVENTOR(S) | : Sun Xiaoning | |

It is certified that error appears in the above-identified patent and that said Letters Patent is hereby corrected as shown below:

On the title page, Item (73), The Assignee's information is incorrect. Item (73) should read:

-- (73) Assignees: Sony Corporation, Tokyo (JP); Sony Mobile Communications AB, Lund (SE) --

Signed and Sealed this
Sixteenth Day of September, 2014

Michelle K. Lee
*Deputy Director of the United States Patent and Trademark Office*